United States Patent [19]

Koskiniemi

[11] Patent Number: 5,482,989
[45] Date of Patent: Jan. 9, 1996

[54] CALCIUM PYROBORATE AS A MICROBICIDE FOR PLASTICS

[75] Inventor: Mark S. Koskiniemi, Memphis, Tenn.

[73] Assignee: Buckman Laboratories Internationa, Inc., Memphis, Tenn.

[21] Appl. No.: 293,217

[22] Filed: Aug. 19, 1994

[51] Int. Cl.⁶ ..................................... C08K 3/38
[52] U.S. Cl. .................. 524/404; 524/405; 524/436; 523/210; 523/216; 523/122
[58] Field of Search .................... 524/404, 405, 524/436; 523/210, 216, 122

[56] References Cited

U.S. PATENT DOCUMENTS 4,086,197  4/1978  Rei et al. .
5,066,334  11/1991  Pera et al. ......................... 106/462
5,066,334  11/1991  Pera et al. .
5,270,108  12/1993  Savoy .

*Primary Examiner*—Edward Cain
*Attorney, Agent, or Firm*—Finnegan, Henderson, Farabow, Garrett & Dunner

[57] ABSTRACT

The use of calcium pyroborate to protect plastic materials from microbiological, growth, attack, or degradation, is described. The calcium pyroborate may be modified to reduce its solubility in water and provide longer microbicide effectiveness.

21 Claims, No Drawings

CALCIUM PYROBORATE AS A MICROBICIDE FOR PLASTICS

BACKGROUND OF THE INVENTION

1. Field of the Invention

This invention relates to a plastic material containing a microbicidally effective amount of calcium pyroborate and a process for protecting a plastic material from microbiological attack.

2. Description of the Related Art

Microbiological fouling of plastic materials is an unwanted nuisance and a problem in many household and industrial environments. The humid and high moisture environments where plastic materials are often used provide excellent growth environments for unwanted microorganisms such as mold, fungi, and mildew. In addition to degrading and fouling plastic materials, these microorganisms can cause unsightly stains and unpleasant odors.

The plastics industry has used various microbicides to prevent the growth of microorganisms on plastic materials. U.S. Pat. Nos. 4,086,297 and 5,270,108 provide a discussion of the use of microbicides with plastics. Barium metaborate is an example of a microbicide used in a wide variety of plastics. OBPA, Oxy-Bis-Phenoxy-Arsine, the most commercially significant microbicide, is found in a wide range of plastic consumer goods such as waterbed mattresses and shower curtains.

As environmental concern has increasingly focused on contaminants introduced into groundwater, regulatory scrutiny has also focused on the disposal of many materials and products including plastics. Regulatory authorities have discouraged or even regulated the use of acute human toxicants and carcinogenic materials. Thus, the plastics industry has been looking for environmentally favorable biocides.

The plastics industry places strict physical requirements on microbicides for use in plastic materials. The microbicide should be temperature and pressure stable. It should have limited solubility in water to perform as a long term microbicide of a plastic article. For exterior applications where the plastic material is exposed to the environment, the microbicide should also have significant ultraviolet radiation stability. Thus, there remains a need for an effective biocide which is useful with plastic materials and articles and meets the strict requirements of the plastics industry.

SUMMARY OF THE INVENTION

The present invention is directed to a plastic material comprising plastic and a microbiocidally effective amount of calcium pyroborate. The present invention is also directed to a process for protecting a plastic material from microbiological attack. The process includes the steps of incorporating a microbiocidally effective amount of calcium pyroborate into a plastic premix and forming the premix into a plastic.

DETAILED DESCRIPTION OF THE INVENTION

In one embodiment, the present invention relates to a plastic material comprising plastic and a microbiocidally effective amount of calcium pyroborate. The plastic may be any plastic material including plastic articles, surfaces, coatings fabrics, etc. Calcium pyroborate has been found to be useful as an effective microbicide for a variety of plastics. Advantageously, calcium pyroborate meets the strict requirements placed on microbicides by the plastic industry.

Calcium pyroborate possesses numerous advantages relative to current microbicides used with plastic materials or articles. First, calcium is not regulated as a hazardous material. Second, calcium pyroborate is stable to environmental conditions, such as ultraviolet radiation and heat. Third, calcium pyroborate is not expected to be an acute human toxicant or carcinogen. The EPA has recently stated that, based on a review of toxicology data, boric acid and its salts are benign. Fourth, calcium pyroborate is also compatible with other additives commonly used in plastics. Finally, calcium pyroborate should provide flame retardant activity similar to biocides such as barium metaborate, resulting in a potential added industrial value.

More advantageously, calcium pyroborate has shown significant efficacy in protecting plastic from microbiological growth, attack, fouling and degradation. Calcium pyroborate is efficacious at or below concentrations commonly used for other known microbicides. For example, a plastic material may contain calcium pyroborate in an amount of 0.01 to 25 parts per 100 parts plastic. Where the plastic material is formed from a plastic resin, the amount of calcium pyroborate used is preferably based on the amount of resin in the plastic material. Thus, for example, preferably, the calcium pyroborate is present from 0.5 to 15 parts per 100 parts resin, more preferably 1 to 5 parts per 100 parts resin, and most preferably 2 parts per 100 parts resin. The amount of calcium pyroborate employed may also relate to the severity of the environment into which the plastic is put and to the expectations for microbicide performance. For more severe environments, higher amounts of calcium pyroborate may be used.

A drawback to some current microbicides is their relatively high water solubility. This causes the microbicide to leach out of the plastics and results in the loss of the desired microbicidal protection for the plastic material or article. The toxicity of some microbicides may also be related to their water solubility and subsequent leaching from the plastic material. Consequently, modifying the solubility of a microbicide to reduce its water solubility would increase its safety, effectiveness and provide for longer lasting biocidal activity.

A further embodiment of this invention, therefore, relates to the use of modified calcium pyroborate as a microbicide for plastic materials. Modified calcium pyroborate is any form of calcium pyroborate modified to reduce its solubility in water below that of calcium pyroborate itself.

The degree of modification can be chosen to meet the requirements for the desired level of protection for a given plastic. For example, where the plastic is a one-time-use article, the calcium pyroborate may be used without modification or with only slight modification. Not, or only slightly, decreasing its water solubility would increase the amount of calcium pyroborate available to protect the plastic. Where the plastic is used repeatedly or over a longer time period, the calcium pyroborate can be modified to a greater extent to decrease or eliminate any leaching from the plastic.

An advantage of the present invention is that calcium pyroborate as a microbicide, due to its heat stability, is not expected to interfere with a plastic recycling process. Given the environmental safety of calcium pyroborate, recycling plastic containing calcium pyroborate also should not introduce any toxic or offensive components into the recycling system. Advantageously, its stability would ensure that a recycled plastic may, to some extent, have the same biocidal capabilities as an original plastic.

The calcium pyroborate can be modified by any method known to decrease its water solubility. Such methods include, but are not limited to, treating, mixing, or reacting calcium pyroborate particles or powder with other materials. Such methods or treatments also keep the calcium pyroborate from having unacceptable handling characteristics such as agglomeration upon storage, etc.

One method of modifying calcium pyroborate to reduce its water solubility is described in U.S. Pat. No. 5,066,334 to Pera et al. The disclosure of that patent is incorporated here by reference and in its entirety. The modified calcium pyroborate described by Pera et al. is a silica-coated calcium pyroborate pigment in particulate form. The water solubility of the calcium pyroborate is decreased by increasing the amount of silica used to coat the calcium pyroborate.

The water solubility of unmodified calcium pyroborate is approximately 1800 ppm. The solubility may be reduced to as low as 600 ppm with a silica treatment of 21% by weight of the calcium pyroborate. Such a solubility level may require a co-biocide to provide protection in the short term. The co-biocide could, for example, be unmodified calcium pyroborate or another known microbicide mixed in with the modified calcium pyroborate. Preferably, the water solubility of the silica coated calcium pyroborate ranges from 1000 ppm to 1300 ppm.

The product BL-1227 is a preferred silica-coated calcium pyroborate pigment having a water solubility of 1300 ppm. BL-1227 product is available from Buckman Laboratories, Inc., Memphis, Tenn.

Calcium pyroborate, modified or unmodified, may be used with a variety of plastics, including but not limited to thermoplastics, thermosets, or engineered materials, i.e., composites. Preferably the plastic resin used is polyvinyl chloride, polyethylenes, or polyurethane. According to the invention, the term plastic includes, but is not limited to, any plastic material, article, good, surface, fabric, sheet, etc. For example, plastics include shower curtains, waterbed mattresses, siding for homes, liners for swimming pools, roofing membranes, packaging materials, and any variety of household or industrial items used in a moist, humid environment, e.g., soap dishes, countertops, wallpapers for bathrooms and kitchens, plastic fencing material.

Generally, the calcium pyroborate is added or incorporated like or with any other additive to the plastic resin, polymer or other plastic material being used to form a plastic premix. Preferably, the plastic premix is a mixture of plastic resin beads or chips and may contain other conventional additives. The incorporation can be done, for example, in a dry mix or a melt stage. In a melt stage, the premix material is in a pseudo-liquid state where mixing will achieve the greatest degree of uniform dispersion of the calcium pyroborate throughout the plastic.

Anhydrous calcium pyroborate, modified calcium pyroborate, as well as hydrated calcium pyroborate are generally available in particulate or powder forms. The calcium pyroborate may be incorporated into the plastic premix not only as a particle or powder but also as a slurry or dispersion. When using hydrated calcium pyroborate, a slurry or dispersion of calcium pyroborate, the amount of water or other liquid should not be so much as to adversely affect the plastic, its formation, or other processing.

After incorporating the calcium pyroborate into the plastic premix, the premix is then formed into a plastic for further work or as a finished product. The plastic may be heated prior to or during the forming step. Depending on the curing times for the plastic or the finished product, the mixture may be cured, injected into a mold, extruded, calendered, blown, compressed, or otherwise formed or fabricated by means known in the art.

Another embodiment of the invention, then, is a process for protecting a plastic material from microbiological attack. The process includes the steps of incorporating a microbiocidally effective amount of calcium pyroborate into a plastic premix and forming the premix into a plastic.

In order to further disclose the nature of the present invention the following examples illustrate the present invention. All ratios referred to are to be measured in parts by weight. It is to be understood that the invention is not to be limited to the specific conditions or details set forth in these examples except insofar as such limitations are specified in the appended claims.

EXAMPLE 1

Preparation of Test Samples

Test samples based on a typical plasticized polyvinyl chloride (PVC) formulation, i.e., 40 parts plasticizer (dioctylphthalate (DOP)) per hundred parts resin, were made up using the biocides listed below in Table 1. Each biocide, used at 2 parts per hundred parts resin, was dry blended with PVC beads. The mixture was melted and then pressed into sheets.

TABLE 1

| Sample | Biocide |
|---|---|
| A) | modified calcium pyroborate, BL-1227 product |
| B) | 90% barium metaborate pigment product, Busan 11M1 product, Buckman Laboratories, Inc., Memphis, Tenn. |
| C) | talc filler (control) |
| D) | colemanite (control) |
| E) | 20% active 2-(Thiocyanomethylthio)benzothiazole on a solid support, BL-1222 product, Buckman Laboratories, Inc., Memphis, Tenn. |

EXAMPLE 2

Resistance to the Growth of Mold

The resistance to the growth of mold of test samples prepared according to Example 1 was determined using the testing procedure described in ASTM D-3273-82T. ASTM D-3273-82T evaluates a material's resistance to the growth of mold that might occur in a severe mold environment.

The testing device was an environmental chamber kept at a constant temperature of 90° ±2° F. and a relative humidity of 95 to 98%. Within the chamber were dirt boxes containing soil inoculated with the following known organisms: *Aspergillus niger, Aspergillus oryzae,* and an unknown species of Penicillium.

Prior to exposure in the environmental chamber, however, the samples were exposed to a cycle of UV light (4 hours) and condensation (4 hours, no UV) for a total test period of 200 hours. This was to check the UV and moisture resistance of the test materials relative to a known barium metaborate standard product, Example 1B. Barium metaborate is resistant to UV and moisture deactivation and is known to provide a UV-stabilizing effect to PVC materials. Samples A, B, C, and D yellowed slightly as a result of this exposure, and comparative sample E yellowed badly.

Test panels, 3×5 inches and 0.025 inch thick, were hung vertically in the environmental chamber, with the bottom of each panel approximately three inches above the surface of the inoculated soil. Sufficient spacing was left to allow circulation of air and to prevent contact between samples or with wall surfaces. The samples were held in the chamber for 2 months.

The test samples were evaluated according to ASTM D-3274 using photographic reference standards that provide a numerical basis for rating the degree of fungal growth or soil and dirt accumulation on paint films. The numerical basis ranges from zero to ten. Ten indicates an absence of mold growth. A rating of eight signifies slight amount of mold growth. A rating of six signifies medium growth. A rating of four indicates heavy growth, two indicates very heavy growth, and zero indicates complete coverage. Ratings of five or less are usually considered failing scores. The results are shown in Table 2.

TABLE 2

| Sample | Rating |
|--------|--------|
| A | 9 |
| B | 10 |
| C | 5 |
| D | 5–6 |
| E | 8–9 |

EXAMPLE 3

Determining Resistance of Synthetic Polymeric Materials to Fungi

One inch square test samples prepared according to Example 1 were placed onto mycophil agar plates. The surface of the agar and test samples were inoculated with a fungal spore suspension of *Aspergillus niger*. The plates were incubated 21 days at 30° C. Examination of the plates revealed the results shown in Table 3.

The rating basis is a visual inspection to the following scale. A rating of zero indicates no growth. A rating of one indicates growth covering less than 10% of the test sample, two (10–30% coverage), three (30–60% coverage), and four (60–100% coverage). See ASTM G-21.

TABLE 3

| Sample | Rating (average of three values) |
|--------|----------------------------------|
| A | 1.0 |
| B | 3.0 |
| C | 2.3 |
| D | 2.3 |
| E | 1.0 |

What is claimed is:

1. A plastic article formed from a plastic comprising a plastic premix and a microbicidally effective amount of calcium pyroborate.

2. A plastic article of claim 1, wherein the calcium pyroborate is modified to reduce its solubility.

3. A plastic article of claim 1, wherein the plastic is a thermoplastic, a thermoset, or a composite material.

4. A plastic article of claim 2, wherein the plastic comprises a resin and the calcium pyroborate is a silica-coated calcium pyroborate and is present in an amount of 0.01 to 25 parts per hundred parts resin.

5. A plastic article of claim 4, wherein the silica-coated calcium pyroborate is present in an amount of 1 to 10 parts per hundred parts resin.

6. A plastic article of claim 4, wherein the plastic is polyvinyl chloride or polyurethane.

7. A plastic article of claim 1, wherein the plastic comprises a resin and the calcium pyroborate is present in an amount of 0.01 to 25 parts per hundred parts resin.

8. A plastic article of claim 1 wherein the plastic material is a shower curtain, a waterbed mattress, a siding for a building, a swimming pool liner, a countertop, a pipe, a roofing membrane, packaging material, a soap dish, a wallpaper or plastic fencing material.

9. A process for protecting a plastic article from microbiological attack comprising:

incorporating a microbicidally effective amount of calcium pyroborate into a plastic premix and forming the premix into said plastic article.

10. The process of claim 9, wherein the calcium pyroborate is incorporated into a dry plastic premix or into a melt stage of a plastic premix.

11. The process of claim 10, further comprising, before the forming step, the step of heating the plastic premix prior to forming.

12. The process of claim 10, wherein the plastic is formed by curing, injection molding, extrusion, calendering, blowing, or compression.

13. The process of claim 9, wherein the calcium pyroborate is modified to reduce its solubility.

14. The process of claim 13, wherein the calcium pyroborate is a silica-coated calcium pyroborate.

15. The process of claim 12, wherein the plastic is a thermoplastic, a thermoset, or a composite.

16. The process of claim 12, wherein the plastic premix comprises a resin and the calcium pyroborate is a silica-coated calcium pyroborate and is incorporated in an amount of 0.01 to 25 parts per hundred parts resin.

17. The process of claim 16, wherein the calcium pyroborate is present in an amount of 1 to 10 parts per hundred parts resin.

18. The process of claim 16, wherein the plastic premix comprises a polyvinyl chloride resin or a polyurethane resin.

19. The process of claim 11, wherein the plastic premix comprises a resin and the calcium pyroborate is a silica-coated calcium pyroborate and is present in an amount of 0.01 to 25 parts per hundred parts resin.

20. The process of claim 10, wherein the plastic premix comprises a resin and the calcium pyroborate is a silica-coated calcium pyroborate and is present in an amount of 0.01 to 25 parts per hundred parts resin.

21. The plastic article of claim 1, wherein said plastic premix is a plastic resin.

* * * * *

UNITED STATES PATENT AND TRADEMARK OFFICE
CERTIFICATE OF CORRECTION

PATENT NO. : 5,482,989
DATED : January 9, 1996
INVENTOR(S) : Mark S. KOSKINIEMI

It is certified that error appears in the above-identified patent and that said Letters Patent is hereby corrected as shown below:

On the title page, item [73],
    the Assignee information, "Internationa" should read --International--.

Claim 8, col. 6, line 15, "material" should read --article--.

Signed and Sealed this

Twenty-third Day of July, 1996

Attest:

BRUCE LEHMAN

Attesting Officer

Commissioner of Patents and Trademarks